H. C. HANSON.
COOKING UTENSIL.
APPLICATION FILED JAN. 22, 1920.
1,355,332. Patented Oct. 12, 1920.
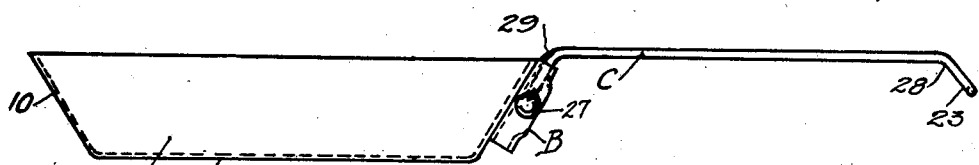
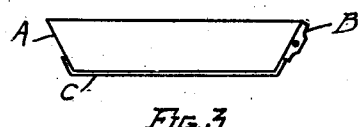
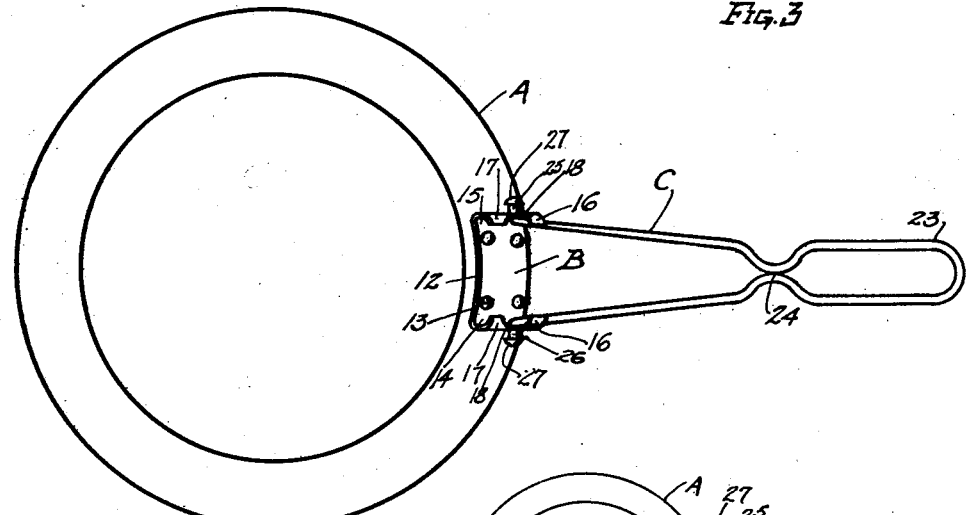
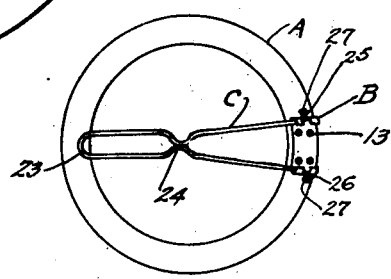
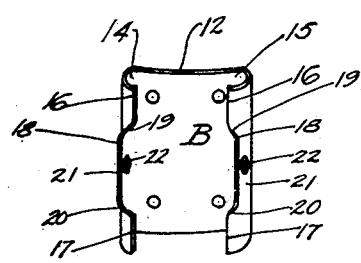
INVENTOR
Hans C. Hanson
BY
Bradbury & Caswell
ATTORNEYS

UNITED STATES PATENT OFFICE.

HANS C. HANSON, OF ALBERT LEA, MINNESOTA.

COOKING UTENSIL.

1,355,332.  Specification of Letters Patent.  Patented Oct. 12, 1920.

Application filed January 22, 1920. Serial No. 353,221.

*To all whom it may concern:*

Be it known that I, HANS C. HANSON, a citizen of the United States, residing at Albert Lea, in the county of Freeborn and State of Minnesota, have invented a new and useful Improvement in Cooking Utensils, of which the following is a specification.

This invention relates to cooking utensils, one of the main objects thereof being to provide a form of cooking utensil which can be used as a frying pan and which has a laterally projecting folding handle, said handle being adapted to fold into compact form when not in use or extended, and to be locked in either position. With this and other objects in view my invention comprises the features of construction and combination of parts hereinafter more particularly described and claimed.

In the accompanying drawing forming part of this specification, Figure 1 is a side elevation of my invention when the handle is extended; Fig. 2 is a bottom plan view of my invention when the handle is extended; Fig. 3 is a side elevation of my invention when the handle is folded; Fig. 4 is a bottom plan of my invention when the handle is folded, and Fig. 5 is a perspective view of the handle attaching clip before it is secured to the body of the pan.

In the drawing A indicates the body of a cooking utensil which may be of any suitable construction, that illustrated being adapted for use as a frying pan and having the usual upwardly and outwardly flaring side 10 and flat bottom 11. My improved handle is arranged so that in one position it extends laterally from the side of the pan and in another position it folds downwardly over the bottom of the pan and closely conforms with its surface so that the entire article in folded condition forms a compact package suitable for use for camping.

My improved handle construction employs a clip B made out of a flat piece of sheet metal, stamped, pressed or cut and shaped with a concave surface 12, conforming closely with the side of the pan to which it is secured by rivets 13 or any other suitable means. The plate forming the clip is shaped with a pair of oppositely disposed channel grooves 14 and 15 by turning the laterally extending ends outwardly and reversing them inwardly. Each of these outwardly reversed ends is formed with a pair of shoulder members 16 and 17 between which a portion of the material is omitted leaving a pair of outwardly extending wide shallow notches 18. The edges of these notches merge into the shoulder members 16 and 17 by reversely curved edges 19 and 20 for purposes to be hereinafter described. The two end faces 21 are perforated at 22, substantially midway between the upper and lower ends of the clip.

The handle bar C which coöperates with the clip comprises a spring wire or rod formed into a loop 23 substantially midway between its ends. The sides of said loop extend parallel for a short distance and then are struck inwardly and joined by soldering, brazing or other suitable means at their point of contact 24. The remaining spring portions of the sides of the handle bar spread outwardly apart and are formed with off set bearings 25 and 26 at their extremities projecting apart and through the perforations 22 in the ends 21 of the clip. The tips of these bearing extremities are formed with heads 27 to prevent detachment of the handle bar from the clip. The length of the bearings 25 and 26 is sufficient to permit the sides of the handle bar being sprung inwardly toward each other clear from below the shoulder members of the clip, so that the handle bar can be swung to engage below either pair of shoulders 16 or 17. After the handle bar has been moved from engagement below one pair of shoulders by compressing the sides inwardly and then releasing the same the handle bar can be swung until it engages automatically below the opposite pair of shoulders, the guiding edges 19 or 20 causing this automatic engagement to transpire. In one position the handle bar when engaged below the shoulders 16 is held rigidly in outwardly extending position from the body of the pan and in its other position it folds over the bottom of the pan where it is held while conforming to the lower outer surface. The outer end of the handle bar which comprises the loop 23 is bent downwardly at 28 so that when desired a stick or bar can be inserted through the loop and made to engage below the inwardly struck portions which are connected at 24, to form an extension of the handle. Thus when the handle is hot or it is desired to support the frying pan over a camp fire while the attendant stands at a distance away from the fire, an effective extension can easily and quickly be provided. The inner ends of the sides of the handle bar are bent downwardly at 29 so that the handle will closely conform with the bottom of the pan when folded and extend horizontally when assuming handle forming position.

The entire device is simple and inexpensive in construction and is strong and durable. It can easily and quickly be adjusted into extended or folded condition and when folded forms a compact package suitable for carrying in camping kits.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent, is:—

1. A cooking utensil body, a handle for said body having a pair of pivot ends spread outwardly under spring tension, and a clip secured on the wall of said body having a pair of outwardly extending perforated ends through which said pivot ends hingedly engage so that the handle can be swung either into handle forming or folded position on the body, each of said outwardly extending ends being reversed inwardly and formed with a pair of shoulders disposed at either side of a companion pivot connection of said handle and clip, below one of which shoulders a side of said handle is engaged to hold the handle rigidly when extended in handle forming position and below the other of which shoulders said side engages to hold the handle rigidly when folded upon the body.

2. A cooking utensil body having a side wall, a handle for said body having a pair of outwardly spreading pivot ends urged outwardly under spring tension, and a clip secured on said side wall having a pair of ends struck outwardly and forming sides in which said pivot ends are hingedly secured and free to slide, each end of said clip being formed with a pair of inturned shoulder ends with an intervening notch lying over a companion pivot connection of said handle, the margin of said notch gradually merging into said shoulder elements whereby the handle in turning will be urged inwardly to engage below a shoulder automatically.

3. A cooking utensil resembling a frying pan having a flat bottom and an upwardly and outwardly flaring side, a clip secured to said side having a pair of outwardly struck ends, each end having a pair of inwardly extending shoulders with an intervening notch below which the adjacent end wall of the clip is perforated, and a handle formed by a spring rod flexed between its ends into a downwardly slanting loop, and having its sides struck inwardly and joined to form a shoulder and reinforce the handle a short distance inwardly from said loop, the remaining side portions of the handle diverging and bent downwardly and their extremities being turned apart and passing through said perforations to form a hinge connection and engage the clip under spreading spring tension, whereby the sides of the handle will engage below one set of shoulders to lock the handle in outwardly extending handle forming position and can be compressed inwardly to swing freely into folded condition over the bottom of the pan and into locking engagement below the remaining pair of shoulders when released, the outer end of said handle being adapted to receive a supplemental handle bar through said loop and below said reinforcing shoulder.

In testimony whereof, I have signed my name to this specification.

HANS C. HANSON.